United States Patent [19]
van der Heijden

[11] Patent Number: 5,337,929
[45] Date of Patent: Aug. 16, 1994

[54] MIXING CHAMBER FOR MIXING A GASEOUS AND A LIQUID COMPONENT

[75] Inventor: Edgar I. M. van der Heijden, Breda, Netherlands

[73] Assignee: Airspray International B.V., Beverwijk, Netherlands

[21] Appl. No.: 828,953

[22] PCT Filed: Jul. 17, 1990

[86] PCT No.: PCT/NL90/00097
§ 371 Date: Feb. 7, 1992
§ 102(e) Date: Feb. 7, 1992

[87] PCT Pub. No.: WO91/01259
PCT Pub. Date: Feb. 7, 1991

[30] Foreign Application Priority Data

Jul. 20, 1989 [NL] Netherlands ............ 8901877

[51] Int. Cl.$^5$ ............................. B65D 83/58
[52] U.S. Cl. .................. 222/402.18; 222/635
[58] Field of Search .......... 222/402.1, 402.18, 635

[56] References Cited

U.S. PATENT DOCUMENTS

| | | | |
|---|---|---|---|
| 3,159,318 | 12/1964 | Green | 222/402.18 |
| 3,583,606 | 6/1971 | Ewald | 222/402.18 |
| 4,227,631 | 10/1980 | Schneider | 222/635 |
| 4,396,152 | 8/1983 | Abplanalp | 222/402.18 X |
| 4,431,119 | 2/1984 | Stoody | 222/402.18 X |
| 4,940,171 | 7/1990 | Gilroy | 222/402.18 |

FOREIGN PATENT DOCUMENTS

| | | |
|---|---|---|
| 2347546 | 3/1975 | Fed. Rep. of Germany . |
| 2014248 | 8/1979 | United Kingdom ......... 222/402.18 |
| 2060080 | 4/1981 | United Kingdom . |

Primary Examiner—Andres Kashnikow
Assistant Examiner—Joseph A. Kaufman
Attorney, Agent, or Firm—Larson and Taylor

[57] ABSTRACT

A mixing chamber for mixing a gaseous component with a liquid component is disclosed. The mixing chamber is characterized by separate inlet connections for the respective components and an outlet for the mixture to a space at a lower pressure. The propellant inlet comprises a plurality of narrow channels positioned to create a turbulent flow in the mixing chamber to facilitate mixing of the components. Also disclosed is a method for forming narrow channels in a body or object by forming grooves in one of two interconnecting surfaces of the parts to thereby define the narrow channels when the parts are put together to form the body or object.

10 Claims, 1 Drawing Sheet

MIXING CHAMBER FOR MIXING A GASEOUS AND A LIQUID COMPONENT

FIELD OF THE INVENTION

The present invention relates to a mixing chamber for mixing a gaseous and a liquid component, said mixing chamber being provided with separate inlet connections for the pressurized components for the mixture which is to be formed, and an outlet connection for the formed mixture to a space which is at a lower pressure.

BACKGROUND OF THE INVENTION

Mixing a gaseous and a liquid component with a view to forming a fine mist can lead to difficulties when the fine droplets formed in a spray nozzle flow together in the jet to form larger drops. This leads to an irregular distribution of the liquid on a sprayed surface. By the use of a propellent gas, which dissolves in the liquid and evaporates easily therefrom, such flowing together may be avoided, but there is a growing concern about the use of such propellent gases because of their harmful effects on the environment or their flammability.

When air is used as a propellent, the flowing together of the formed droplets can be prevented by mixing it with the liquid by turbulence in a mixing chamber, but it is difficult to achieve a satisfactory mix in the case of mixing chambers of small size. This applies especially in the case of aerosol cans, in which the mixing chamber needs to be integrated with the distribution valve and the spray nozzle to a unit of limited size which is to be placed on an aerosol can. This impedes the wider use of aerosols using air as their propellent, so that aerosols using the harmful propellent gases remain in general use. In view of, inter alia. a ban in the foreseeable future of the latter aerosols, there is a great need for a solution to this problem. However, this problem of mixing is not limited to aerosol cans and the finding of a solution for such aerosol cans may lead to its application in other fields.

SUMMARY OF THE INVENTION

The solution to the problem is provided by a mixing chamber for mixing a gaseous and a liquid component, said mixing chamber being provided with separate inlet connections for the pressurized components for the mixture which is to be formed, and an outlet connection for the formed mixture to a space which is at a lower pressure and wherein at least one of the inlet connections consists of narrow channels in a wall of the mixing chamber with a transverse dimension not greater than about 1 mm, and preferably less than about 0.25 mm.

It has been found that by the use of such narrow channels a mixing suitable for the aforementioned purpose can be achieved, while their dimensions and number may depend on the viscosity of the liquid and the size and construction of the assembly formed by the mixing chamber and the outlet means connected thereto.

The forming of such channels is extremely problematical, especially in the case of mixing chambers formed by injection moulding such as are used in aerosol cans. The use of laser beams is not merely expensive, but may lead to inaccuracies if used on plastics. According to the present invention, this drawback may be eliminated by application of a mixing chamber comprising two parts having connecting surfaces which meet at the inner wall, at least one of these surfaces being provided with grooves which, together with the other said surface, delimit the narrow channels. Such grooves may be formed in a perfectly reproducible way, particularly in moulds for forming plastic parts.

Further details are enumerated in the other sub-claims.

The invention further relates in general terms to a method for forming narrow channels in a body or object by producing the body or object out of two parts interconnecting via a surface, in that grooves are formed in at least one of the interconnecting surfaces which, together with the interconnecting surface portion of the other part, delimit the narrow channels, and in that the two portions are put together to form the finished body or object. In a more preferred embodiment the method is carried out using a self-releasing injection mould provided with the appropriate form surfaces with grooves, which, together with the cooperating mould surfaces, define the grooves in the finished casting.

BRIEF DESCRIPTION OF THE DRAWINGS

The invention will be explained in greater detail with reference to a drawing, in which.

DETAILED DESCRIPTION OF THE INVENTION

Figure 1:
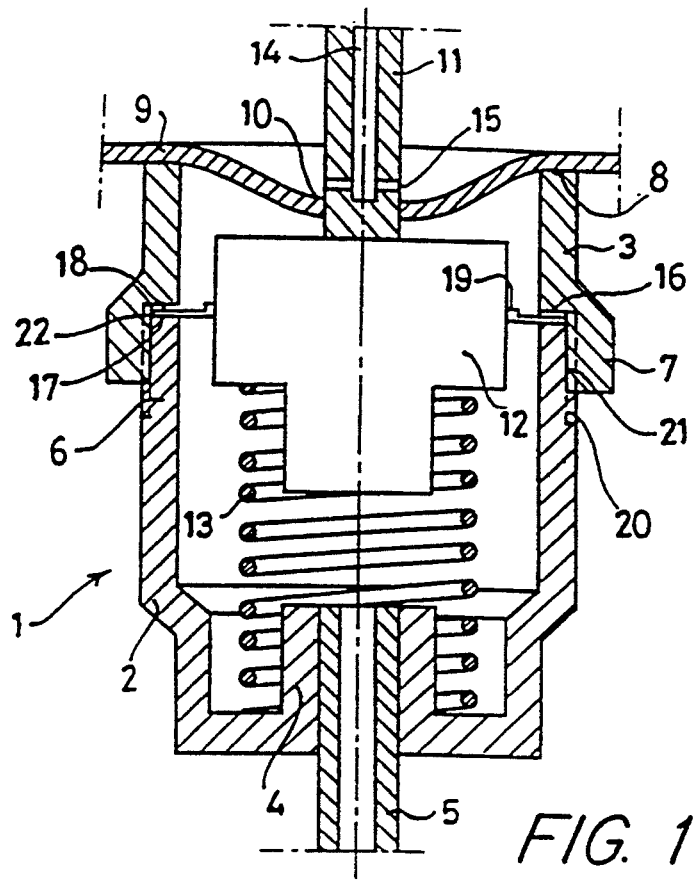
FIG. 1 is a cross-sectional diagram of an example of a mixing chamber according to the invention.

The mixing chamber shown in FIG. 1 is part of an aerosol can of which no further description will be given. This mixing chamber 1 consists of a cup-shaped lower part 2 and a ring-shaped cap 3.

The cup 2 is provided on the bottom with a connector pipe for an immersion tube 5 which is immersed in the liquid contained in the aerosol can.

A collar 7 of the cap 3 fits onto the upper edge 6 of the cup 2, its internal diameter corresponding to the external diameter of the edge 6 while the internal diameter of the portion of the cap 3 interconnecting with the collar 7 being equal to the internal diameter of at least the upper edge of the cup 2.

The upper edge 8 of the cap 3 is in sealing contact with a ring seal 9, which is part of the distribution valve assembly of the aerosol can. The lower end of a hollow stem 11 projects into a central orifice 10 of this ring seal 9, said stem being connected to the spray head of the aerosol can. The lower end of the stem 11 rests against a pressure body 12 which is biased upwards by a spring 13 which rests against the bottom of the cup 2, the uppermost position of the stem being defined by an abutting surface which will not be further described.

The lengthwise bore 14 of the stem 11 is in the present case connected with the exterior on either side through a transverse bore 15 which, in the situation here depicted, is above the ring seal 9. The number of transverse bores issuing may be more or less. When the stem 11 is pressed in, it moves within the orifice 10 and the transverse bore 15 comes to be situated on the other side of the ring seal 9, so that the lengthwise bore is connected with the interior of the mixing chamber.

Figure 2A:
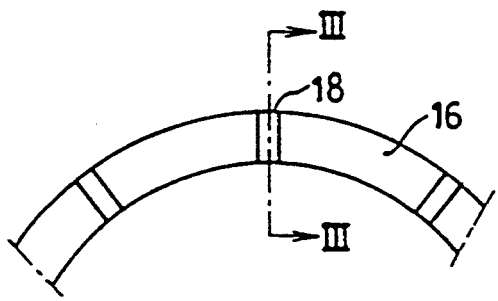
FIGS. 2A and 2B are views on an enlarged scale of a part of the mixing chamber.
Figure 2B:
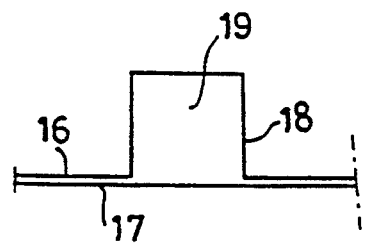
Figure 3:
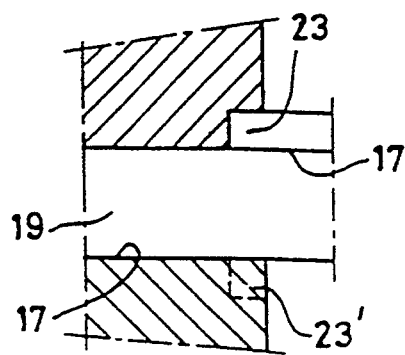
FIG. 3 is a section along the line III—III in FIG. 2A of a somewhat modified form.

The cap 3 has near its transition to the collar 7 a transverse shoulder 16 which rests against the end surface 17 of the cup 2 and is provided with a number of grooves 18 which are more clearly depicted in FIG. 2. These grooves together with the end surface 17 delimit channels 19 which connect the exterior of the mixing chamber, in which the propellent is present, to the interior of the mixing chamber. To that end, the external wall of the upper edge 6 of the cup 2 is provided with grooves 20 which together with the collar 7 define passages 21.

It will be obvious that the grooves 18 may alternatively be formed in the end surface 17 and that the grooves 20 may also be formed in the collar 7. In order to ensure a satisfactory interconnection between the passages 21 and the channels 19, the upper edge 16 of the cup 2 is bevelled on its outside, as is indicated at 22.

After the stem 11 is pressed in, the liquid will be driven out of the aerosol can via the tube 5 into the annular space around the body 12 of the mixing chamber 1, the propellent gas also entering into this space via the channels 19. A turbulence then occurs, by which a satisfactory mixing of liquid and propellent gas is achieved, which will lead to a fine mist as the mixture leaves the nozzle of the aerosol.

This is particularly significant if air is used as the propellent gas, since air dissolves so badly in the liquid to be sprayed that the flowing together of droplets is not thereby stopped. By mixing in air in the mixing chamber that can be avoided. This, by the way, also applies for other propellent gases as well, if the formation of mist without mixing them in should be insufficient.

The channels must have a diameter such that satisfactory mixing takes place. This, of course, also depends on the shape of the mixing chamber 1 and the nature of the liquid to be sprayed. If air is used as the propellent gas, a total area of the channels 19 of 0.3 $mm^2$ will be suitable, which, divided over, say, seven channels, leads to channels with a width of about 0.2 mm.

The number of channels 19 depends on the turbulence to be achieved in the mixing chamber. It is preferable to choose an odd number if the number of transverse bores 15 in the end of the stem is an even one and contrariwise, in order to avoid as much as possible a direct influx from a channel 19 into a transverse bore 15. It is also possible to have the grooves 17 slanted so as to enhance the turbulence.

FIG. 3 shows a modified example. In this embodiment, the channels 19 issue into a circumferential groove 23 in the inner wall of the mixing chamber. This has proved to enhance the mixing. The groove may also, or instead, be provided in the upper portion of the cup, as is shown in FIG. 3 in dotted lines at 23'.

Because the mixing chamber is formed of two parts 2 and 3, the various grooves 18 and 20 may be easily formed during injection moulding of these parts, so that inexpensive mass-production is possible. Channels of the aforesaid limited size cannot be achieved in properly controllable sizes by conventional methods (such as fillers in injection moulds, laser beams and suchlike), especially in mixing chambers of limited size, as is the case with mixing chambers for aerosol cans.

It has been found that if the channel dimensions are suitably chosen in relation to the dimensions of the immersion tube 5 and/or the annular passage 13, an aerosol can provided with such a mixing chamber 1 will also work satisfactorily if held upside down, so that the channels 19 interconnect with the liquid space and the tube 5 with the propellent gas space.

It will be obvious that the invention is not limited to the examples herein described and may be applied in all cases where small channels are desirable or necessary.

Another advantage of the production of such narrow channels using the above method is that as the mould becomes slightly worn, the membranes which may form will not form at the ends of the channels or passages, so that these will never close up.

I claim:

1. Mixing chamber for mixing a gaseous and a liquid component, said mixing chamber being provided with separate inlet connections for pressurized components for the mixture which is to be formed, and an outlet connection for discharging the formed mixture to a space which is at lower pressure, said mixing chamber comprising a lower part and an upper part, said upper and lower parts having adjacent surfaces which meet at an inner side wall of said mixing chamber, said upper and lower parts enclosing a pressure body located in the upper region of the mixing chamber and a spring located in the lower region of the mixing chamber which biases the pressure body upwardly, said pressure body and the inner wall of the upper region of the mixing chamber forming an annular space around the pressure body, said lower part having a liquid inlet for passage of a pressurized liquid component into said mixing chamber, at least one of the adjacent surfaces of said upper and lower parts being provided with grooves which define, together with the surface of the other part, narrow channels substantially perpendicular to the longitudinal axis of the mixing chamber and having a transverse dimension equal to or less than 1 mm, said narrow channels opening into said annular space around the pressure body at the upper region of the mixing chamber and providing an inlet for passage of a pressurized gaseous component into said mixing chamber.

2. Mixing chamber according to claim 1, wherein said lower part of the mixing chamber is cup-shaped and has an open upper end, and wherein said upper part of the mixing chamber comprises a cap having an open lower end which mates with the opening of said cup-shaped part.

3. Mixing chamber according to claim 2, wherein said cap comprises a collar which fits around an exterior wall of said cup-shaped part and wherein said collar is provided with grooves for passage of a pressurized gaseous component to said narrow channels.

4. Mixing chamber according to claim 3, wherein an outer edge of the external wall of the cup-shaped part is bevelled, in order to ensure an interconnection between the grooves in said collar and said narrow channels.

5. Mixing chamber according to claim 2 wherein the lower, open end of said cap comprises a shoulder, said adjacent surface of said upper part being located on said shoulder, and said adjacent surface of said lower part being located on the open upper end of said lower part.

6. Mixing chamber according to claim 1, wherein the interior wall of the mixing chamber is provided with a recess at the end of said narrow channels, which recess defines a circumferential groove in the interior wall of the mixing chamber into which said gaseous component issues from the narrow channels on its way into the mixing chamber.

7. Mixing chamber according to claim 1 intended for an aerosol can for spraying a liquid with propellant gas provided above the liquid surface, said outlet connection of said mixing chamber comprising a hollow stem of an aerosol head, said hollow stem having a bore which is positioned such that it can be placed in fluid communication with the mixing chamber by means of a distribution valve.

8. Mixing chamber according to claim 7, wherein the bore of the stem is connected to the mixing chamber by means of transverse bores wherein, when the number of said narrow channels is odd, the number of transverse bores is even and wherein when the number of said narrow channels is even, the number of transverse bores is odd.

9. Mixing chamber according to claim 1, wherein all parts of the mixing chamber are formed by injection moulding.

10. Mixing chamber according to claim 1 wherein the transverse dimension of the narrow channels is less than 0.25 mm.

* * * * *